United States Patent
Lee et al.

(10) Patent No.: US 7,451,010 B2
(45) Date of Patent: Nov. 11, 2008

(54) CHIP INFORMATION CHARACTER SET GENERATION SYSTEM AND METHOD OF MARKING A CHIP WITH A CHIP INFORMATION CHARACTER SET

(75) Inventors: Sang-Won Lee, Yongin-si (KR); Kui-Wn Kim, Suwon-si (KR); Hyo-Jin Sim, Osan-si (KR)

(73) Assignee: Samsung Electronics Co., Ltd. (KR)

( * ) Notice: Subject to any disclaimer, the term of this patent is extended or adjusted under 35 U.S.C. 154(b) by 76 days.

(21) Appl. No.: 11/639,926

(22) Filed: Dec. 15, 2006

(65) Prior Publication Data
US 2007/0138252 A1    Jun. 21, 2007

(30) Foreign Application Priority Data
Dec. 16, 2005    (KR) ...................... 10-2005-0124246

(51) Int. Cl.
*G06F 19/00* (2006.01)
*G06F 17/00* (2006.01)

(52) U.S. Cl. .................. 700/115; 700/121; 700/166; 700/227; 235/375

(58) Field of Classification Search .......... 700/115, 700/116, 121, 166, 215, 221, 222, 224, 225–227; 235/375

See application file for complete search history.

(56) References Cited

U.S. PATENT DOCUMENTS

| 5,350,715 A * | 9/1994 | Lee ............................ 438/16 |
| 6,179,207 B1 | 1/2001 | Bossen et al. |
| 7,062,346 B2 * | 6/2006 | Takagi et al. ................ 700/116 |
| 2007/0020782 A1 * | 1/2007 | Rathei ......................... 438/14 |

FOREIGN PATENT DOCUMENTS

| KR | 10-2002-0006061 A | 9/2002 |
| KR | 10-2005-0008057 A | 1/2005 |

\* cited by examiner

*Primary Examiner*—Sean P Shechtman
(74) *Attorney, Agent, or Firm*—Mills & Onello LLP

(57) ABSTRACT

A chip information character set including a lot ID for chip-marking, which has a smaller number of characters than that of a conventional lot ID used in a fabrication line for a semiconductor device, is generated by coding the conventional lot ID using a decimal numeration system or a 62 decimal numeration system. A wafer identifier for chip-marking having 1-character is generated by coding a conventional number of a wafer using a set of identification symbols. A chip coordinate for chip-marking is having either 1-character or 2-characters is generated by coding a conventional coordinate of a chip in the wafer using the decimal or 62 decimal numeration system. The chip information character set has a simplified form to be written in a relatively short time, thereby increasing a productivity of the semiconductor device.

22 Claims, 2 Drawing Sheets

CHIP INFORMATION CHARACTER SET GENERATION SYSTEM AND METHOD OF MARKING A CHIP WITH A CHIP INFORMATION CHARACTER SET

CROSS-REFERENCE TO RELATED APPLICATIONS

This application claims priority under 35 USC § 119 to Korean Patent Application No. 10-2005-0124246 filed on Dec. 16, 2005 in the Korean Intellectual Property Office (KIPO), the contents of which are herein incorporated by reference in its entirety for all purposes.

BACKGROUND OF THE INVENTION

1. Field of the Invention

The present invention relates to a chip information character set generation system used in a semiconductor device and a method of marking a chip of the semiconductor device with a chip information character set. More particularly, the present invention relates to a chip information character set generation system configured to generate a chip information character classifying semiconductor chips in a semiconductor device into superior goods and inferior goods and indicating information about the semiconductor chips, and a method of marking the semiconductor chips of the semiconductor device with the chip information character set.

2. Description of the Related Art

Generally, a semiconductor device is manufactured by unit processes such as a deposition process, a photolithography process, an etching process, an ion implantation process, a metal wiring forming process, etc. The unit processes are repeatedly performed on a wafer including a semiconductor material such as silicon so that a plurality of semiconductor chips is formed on the wafer.

Mostly, the unit processes are performed by the lot, consisting of 25 pieces of wafers, and a lot identification (ID) is granted to each lot. Additionally, the unit processes are performed and managed per each lot ID in a fabrication line for a semiconductor device. Thus, specific information, such as a current position or a processing state of a wafer, can be determined using the lot ID.

An electric die sorting (EDS) process is performed on a wafer that has been fabricated out, and on which semiconductor chips have been formed. In the EDS process, a pre-laser test is performed to determine a normality of the semiconductor chips on the wafer. In addition, a laser repair process is executed to restore chips among abnormal semiconductor chips. Then, a post-laser test is performed to determine a normality of the restored semiconductor chips. Finally, a test to determine a normality of the semiconductor chips is performed under conditions that are different from those of the pre-laser test and the post-laser test.

After the EDS process is performed, the semiconductor chips on the wafer are classified into superior goods and inferior goods. In an inking process, each semiconductor chip that has been classified as an inferior good can be indicated by marking a dot on a front face of the semiconductor chip. Then, a sawing process is performed on the wafer to divide the semiconductor chips formed on the wafer. Finally, a packaging process is performed to assemble each divided semiconductor chip that does not have a dot on the front face, thereby completing a semiconductor device.

However, information about each semiconductor chip can not be known after the divided semiconductor chips are assembled into the semiconductor package by the packaging process. Here, a position of each assembled semiconductor chip on/in a wafer can remain unclear, and an exact time and a manufacturing apparatus used to perform the processes on each assembled semiconductor chip can be also unclear. Furthermore, whether there were any noticeable reactions while manufacturing the semiconductor device can be unknown. As described above, an analysis of the semiconductor chips is rather challenging because a history of each assembled semiconductor chip is unknown. Thus, determining causes of defects of the assembled semiconductor chips can be difficult when the defects are generated or come to light.

In order to avoid the above-mentioned problems, there has been an effort to develop a process for writing information about each chip on a rear face of each superior good, instead of performing the inking process in which a dot is marked on the front face of each inferior good. This alternative method not only divides the semiconductor chips into the superior and the inferior goods, which can have been performed by the conventional inking process, but also writes a lot ID, a wafer number, and a coordinate of each semiconductor chip on the rear face of the each superior good, thereby enabling further access to the information about the semiconductor chips in the future. An example of a chip information character written on a rear face of a chip is described as follows.

P51841X01100100

Here, "P51841X" indicates a lot ID, "01" represents a wafer number, i.e., here the indicated wafer is a first wafer, and "100100" means a chip coordinate in the wafer. That is, here, the indicated chip is located at a coordinate of 100×100, all of which are used in a fabrication line for a semiconductor device. As shown above, when the chip information character includes the lot ID, the wafer number, and the chip coordinate in the wafer, the chip information character has a large number of characters, such as 11 to 15 characters.

Further, when a net die, i.e., a number of usable chips produced from a wafer, is great, the number of chips on each of which the chip information character is marked increases because the lot ID, the wafer number, and the chip coordinate in the wafer are marked on the rear face of each chip as described above.

Therefore, marking the lot ID, the wafer number, and the chip coordinate in the wafer on the chip requires much time, thereby decreasing a productivity of the semiconductor device.

SUMMARY OF THE INVENTION

In accordance with various aspects of the present invention, provided is a chip information character set generation system configured to generate a chip information character set indicating information about a chip, wherein the chip information character set can be marked on a rear face of the chip in a relatively short time.

In accordance with other aspects of the present invention, provided is a method of marking a chip with a chip information character set configured to indicate information about the chip on a rear face of the chip, wherein the method can be performed in a relatively short time.

According to one aspect of the present invention, there is provided a chip information character set generation system comprising: a processor coupled to at least one storage device, the storage device configured to store the chip information character set; a computer program code loaded on the at least one storage device and executable by the processor to perform a method of generating the chip information character set for chip marking from a conventional chip information character set. The method comprises: generating a lot ID from the conventional lot ID used in a fabrication line for a semiconductor device, by coding the conventional lot ID using at least one of a decimal numeration system or a 62 decimal numeration system, wherein the generated lot ID has fewer characters than the conventional lot ID; generating a 1-character wafer identifier from a conventional wafer number by coding the conventional wafer number as a symbol from a set of identification symbols; and generating a 1- or a 2-character chip coordinate from conventional chip coordinates of the chip in the wafer by coding the conventional chip coordinates using at least one of the decimal numeration system or the 62 decimal numeration system, wherein the generated chip coordinate has fewer characters than the conventional chip coordinates.

The generated lot ID can include a numeral, an alphabetical small letter and an alphabetical capital letter in the 62 numeration system.

The generated lot ID can be a 3-character sequence.

The generated chip coordinate can include a numeral, an alphabetical small letter and an alphabetical capital letter in the 62 numeration system.

The generated chip coordinate can be a 2-character sequence.

The generated chip coordinate can indicate an order in which the chip is to be probed for a test in an electric die sorting (EDS) process.

The generated wafer identifier can include an alphabetical letter.

The set of identification symbols can be not more than about 25 predefined identification symbols.

According to another aspect of the present invention, provided is a method of marking a chip with a chip information character set. The method comprises acquiring a conventional chip information character set including a conventional lot ID, a conventional wafer number, and a conventional chip coordinate in the wafer used in a fabrication line for a semiconductor device are acquired. A lot ID for chip-marking is generated by coding the conventional lot ID using a decimal numeration system or a 62 decimal numeration system, wherein the lot ID has a smaller number of characters than that of the conventional lot ID. A wafer identifier is generated by coding the conventional number of the wafer including the chip into 1 character using up to 25 identification symbols. A chip coordinate for chip-marking is generated by coding the conventional coordinate of the chip into either 1-character or 2-characters using the decimal numeration system or the 62 decimal numeration system. The generated lot ID, wafer identifier, and chip coordinate for chip-marking can be written on a rear face of the chip.

The generated lot ID can include a numeral, an alphabetical small letter and an alphabetical capital letter in the 62 numeration system.

The generated lot ID can be a 3-character sequence.

The generated chip coordinate can include a numeral, an alphabetical small letter and an alphabetical capital letter in the 62 numeration system.

The generated chip coordinate can be a 2-character sequence.

The generated chip coordinate can indicate an order in which the chip is probed for a test in an electric die sorting (EDS) process.

The generated wafer identifier can include an alphabetical letter.

The generated lot ID, the generated wafer identifier, and the generated chip coordinate can be written only on chips that are determined as superior goods in the EDS process.

The generated lot ID, the generated wafer identifier, and the generated chip coordinate can be written on the rear face of the chip by laser marking.

According to another aspect of the present invention, provided is a method of generating a chip information character set for chip marking from a conventional chip information character set. The method comprises: generating a lot ID from the conventional lot ID used in a fabrication line for a semiconductor device, by coding the conventional lot ID using at least one of a decimal numeration system or a 62 decimal numeration system, wherein the generated lot ID has fewer characters than the conventional lot ID; generating a 1 character wafer identifier from a conventional wafer number by coding the conventional wafer number as a symbol from a set of identification symbols; and generating a 1 or a 2-character chip coordinate from conventional chip coordinates of the chip in the wafer by coding the conventional chip coordinates using at least one of the decimal numeration system or the 62 decimal numeration system, wherein the generated chip coordinate has fewer characters than the conventional coordinates.

The set of identification symbols can be not more than about 25 predefined identification symbols.

The generated lot ID can include a numeral, an alphabetical small letter and an alphabetical capital letter in the 62 numeration system.

The generated chip coordinate can include a numeral, an alphabetical small letter and an alphabetical capital letter in the 62 numeration system.

The generated chip coordinate can indicate an order in which the chip is to be probed for a test in an electric die sorting (EDS) process.

According to various aspects of the present invention, each of the generated lot ID, the generated wafer number, and the generated chip coordinate for chip-marking have a simpler form than that of each of the conventional lot ID, the conventional wafer number, and the conventional chip coordinate used in the fabrication line for the semiconductor device. Thus, marking the chip with a chip information character set that includes the generated lot ID, the generated wafer number, and the generated chip coordinate for chip-marking on the rear face of each chip takes less time.

BRIEF DESCRIPTION OF THE DRAWINGS

Various aspects of the invention will become more apparent in view of the attached drawing figures, which are provided by way of example, not by way of limitation, in which.

DESCRIPTION OF THE EMBODIMENTS

Figure 1:
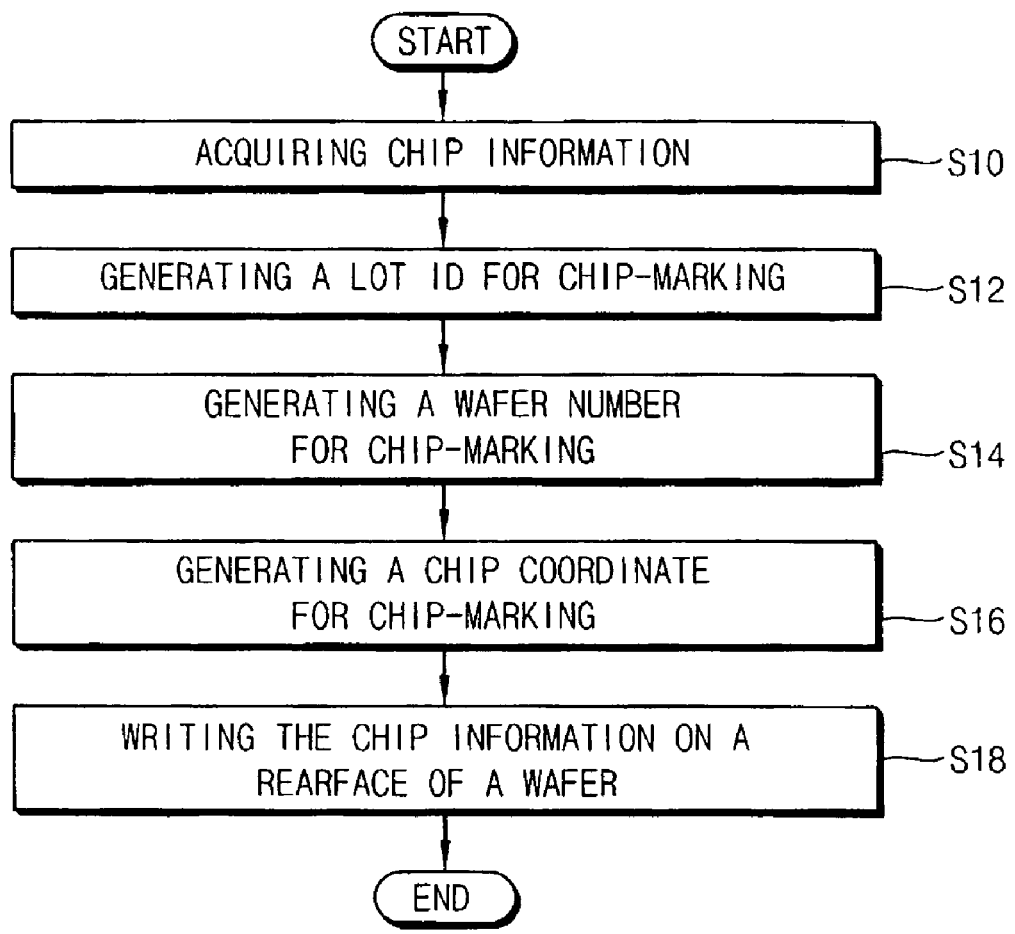
FIG. 1 is a flow chart illustrating an example of a method of generating a chip information character set in accordance with aspects of the present invention.

Detailed illustrative example embodiments of the present invention are disclosed herein. The present invention can, however, be embodied in many different forms and should not be construed as limited to the example embodiments set forth herein. In the drawings, the sizes and relative sizes of layers and regions can be exaggerated for clarity.

It will be understood that when an element or layer is referred to as being "on," "connected to" or "coupled to" another element or layer, it can be directly on, connected or coupled to the other element or layer or intervening elements or layers can be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. can be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, can be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device can be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, some example embodiments of the present invention will be explained in detail.

A chip information character set in accordance with an example embodiment of the present invention is more compact than a conventional chip information character set. The chip information character set can be separately generated from the conventional chip information character set and can be written on a rear face of each chip formed on a wafer. The chip information character set indicates a lot ID, a wafer identifier, and a coordinate of each chip in the wafer in a fabrication line for semiconductor devices, and has a simplified form for marking relative to the conventional chip information character set. That is, the chip information character set includes a lot ID, a wafer identifier, and a chip coordinate for chip-marking corresponding to those in the conventional chip information character set.

Conventionally, a lot ID used in the fabrication line for the semiconductor device consists of a combination of 5 to 7 alphabetical letters and numerals, referred to as a 5-to 7-character sequence. The conventional lot ID indicates a name and a version of the semiconductor device that is formed on a wafer, the fabrication line in which the semiconductor device is manufactured, a name of a process performed to manufacture the semiconductor device, and so on.

In contrast, the lot ID included in the chip information character set in accordance with aspects of the present invention includes a simplified form of the conventional lot ID, having a smaller number of characters than that of the conventional lot ID used in the fabrication line for the semiconductor device. That is, the lot ID for chip-marking is generated by coding the conventional lot ID used in the fabrication line for the semiconductor device into a 3- or a 4-character sequence using a decimal numeration system or a 62 decimal numeration system, which are known in the art.

For example, the lot ID for chip-marking can be a 3-character set that includes a numeral, an alphabetical small letter and an alphabetical capital letter, and is generated by coding the conventional lot ID into a 3-character sequence using the 62 decimal numeration system. When the lot ID for chip-marking is a 3-character sequence using the 62 decimal numeration system, as many as 23,828 lot IDs can be indicated.

The wafer identifier for chip-marking included in the chip information character set in accordance with some example embodiments of the present invention can be represented as 1-character using, for example, 1 of 25 different identification symbols. For example, conventional wafer numbers 1 through 25 can be represented as letters A through Y, respectively.

The chip coordinate in a wafer for chip-marking included in the chip information character set in accordance with some example embodiments of the present invention can be a type of simplified chip coordinate having a smaller number of characters than that of an conventional chip coordinates used in the fabrication line for the semiconductor device and an electric die sorting (EDS) line, for example. That is, the chip coordinate for chip-marking is generated by coding the conventional chip coordinates, which consists of an x-coordinate and a y-coordinate used in the fabrication line for the semiconductor device and the EDS line, into a 1- or a 2-character sequence using the decimal numeration system or the 62 decimal numeration system.

In an example embodiment of the present invention, the chip coordinate for chip-marking need not indicate a conventional chip coordinate in the wafer, but can rather indicate an order in which the chip is probed for a test in the EDS process. That is, when the chip coordinate for chip-marking is represented as a 2-character sequence, as a chip coordinate, a chip probed first can be identified as "00," and a chip probed next can be identified as "01."

For example, the chip coordinate for chip-marking is a 2-character sequence, which can include a numeral, an alphabetical small letter, and an alphabetical capital letter, can be generated using the 62 decimal numeration system. When the chip coordinate for chip-marking is a 2-character sequence using the 62 decimal numeration system, as many as 3,844 chip coordinates for chip-marking can be indicated therein.

When the chip coordinate for chip-marking indicates the order in which the chip is probed for the test in the EDS process, the chip coordinate for chip-marking can represent a number that is the same as that of a net die of the wafer, so as to uniquely indicate each of the chips, a total number of which is the same as the number of the net die. Thus, when the wafer has more than 3,844 net dies, the chip coordinate for chip-marking is required to have more than 2 characters, whereas when the wafer has less than 62 net dies, the chip coordinate for chip-marking can have 1 character.

Particularly, a conventional lot ID, a conventional wafer number, and a conventional coordinate of a chip in the wafer, all of which are used in a fabrication line for a semiconductor device, can be collectively represented as the conventional chip information character set, such as K123456X23100100. Here the conventional lot ID is "K123456," the conventional wafer number is "23," and the conventional coordinate of the chip in the wafer is "100100." In accordance with the present embodiment, a chip information character set is generated with a lot ID, a wafer identifier, and a chip coordinate for chip-marking having a smaller number of characters than that of each of the corresponding conventional lot ID, the conventional wafer number, and the conventional chip coordinate. As an example, the conventional character set K123456X23100100 can be represented as A01W00 in accordance with the present embodiment. That is, the conventional lot ID "K123456X" can be converted into the lot ID "A01," which is a 3-character sequence, the conventional wafer number "23" can be converted into the wafer identfier "W," which is the $23^{rd}$ alphabetical letter, and the conventional chip coordinate "100100" can be converted into the chip coordinate "00," which means a first numeral among 2-character seqeunce in the 62 decimal numeration system because the chip having the conventional chip coordinate "100100" can be probed first.

As shown above, from a conventional chip information set including the conventional lot ID, the conventional wafer number, and the conventional chip coordinate can be generated a chip information character set. Additionally, the conventional lot ID, the conventional wafer number and the conventional chip coordinate used in the fabrication line for the semiconductor device can be regenerated by decoding the chip information character set.

Figure 2:
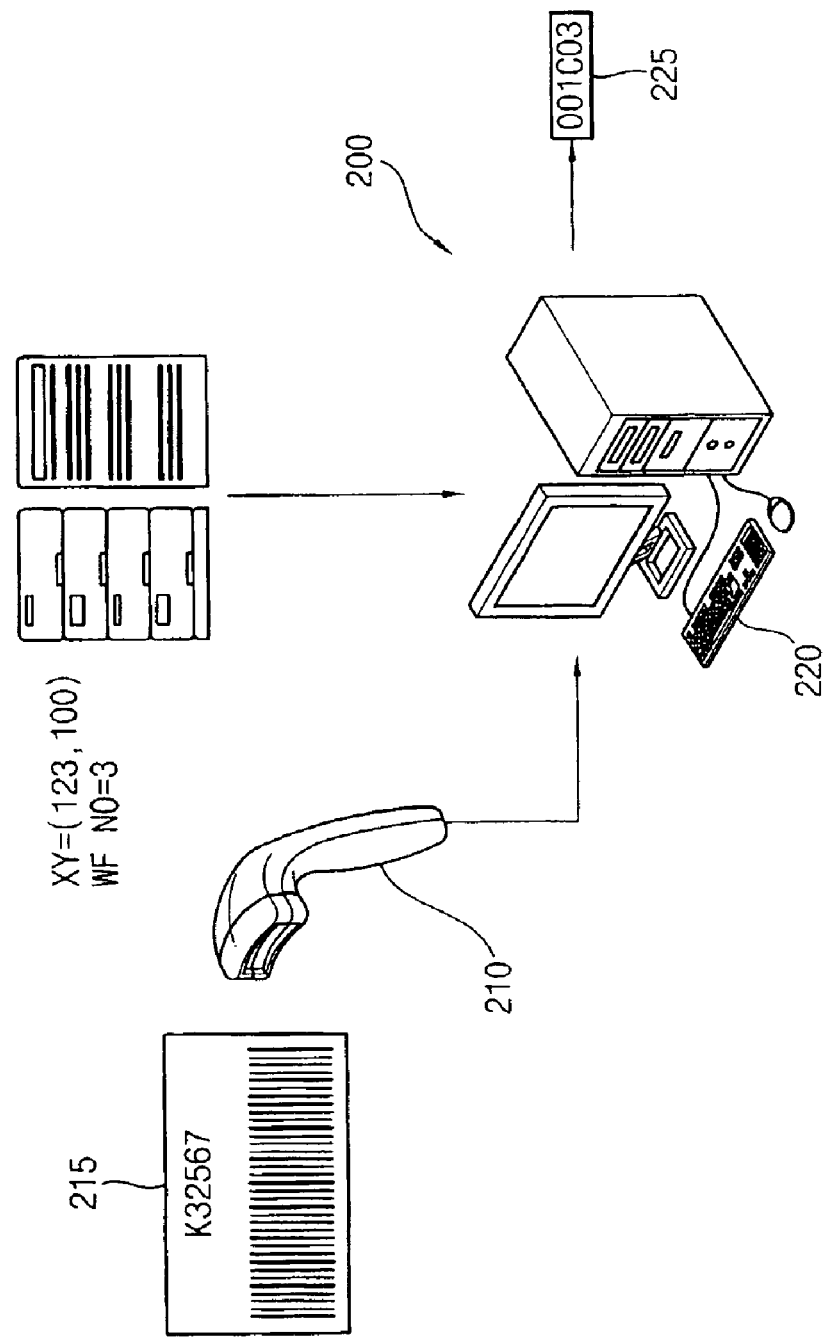
FIG. 2 is a perspective view illustrating an example embodiment of a system that can be used to implement a method of generating a chip information character set in accordance with aspects of the present invention.

FIG. 1 is a flow chart illustrating an example embodiment of method of generating a chip information character set in accordance with an aspects of the present invention, and FIG. 2 is a perspective view illustrating an example embodiment of a system that can be used to implement a method of generating a chip information character set in accordance with aspects of the present invention.

Referring to FIGS. 1 and 2, in step S10, information about each chip in a wafer on which an EDS process has been performed is acquired. Here, the information includes a conventional lot ID, a conventional number of the wafer, and a conventional coordinate of each chip in the wafer used in a fabrication line for a semiconductor device. Further, chips in the wafer are divided into superior goods and inferior goods by the EDS process.

In step S12, a lot ID for chip-marking can be generated by coding the conventional lot ID of the wafer on which the chip is formed into a smaller number of characters than that of the conventional lot ID using a decimal numeration system or a 62 decimal numeration system, for example. Each chip formed on the wafer that is included in the same lot has the same lot ID for chip-marking. Particularly, the lot ID for chip-marking can be a 3- or a 4-character sequence in this embodiment.

In an example embodiment, the lot ID for chip-marking includes numerals such as 0 through 9, alphabetical small letters a through z, and alphabetical capital letters A through Z, so that the lot ID for chip-marking can be a 3-character sequence in the 62 decimal numeration system.

The lot ID for chip-marking can be a 3-character sequence in the 62 decimal numeration system corresponding to an order in which the EDS process has been completed. Additionally, a database including the lot ID for chip marking and the conventional lot ID used in the fabrication line for the semiconductor device corresponding to the lot ID for chip marking can be created and maintained. The lot ID for chip-marking and the conventional lot ID used in the fabrication line for the semiconductor device can be coded or decoded with each other by the database.

Table 1 shows an example in which the conventional lot ID used in the fabrication line for the semiconductor device is coded into a lot ID for chip-marking that is a 3-character sequence in the 62 decimal numeration system, in accordance with the present embodiment.

TABLE 1

| Order | Conventional Lot ID | Lot ID for Chip-Marking |
|---|---|---|
| 1 | K32567 | 001 |
| 2 | 6JAB25 | 002 |
| 3 | QB1253XUB | 003 |
| . | . | . |
| . | . | . |
| . | . | . |
| 38449 | P46280UB | a09 |
| 38450 | K5928X | a0a |
| . | . | . |
| . | . | . |
| . | . | . |
| 235051 | QL2572 | Z99 |
| 235052 | 6JAD48X | Z9a |

As shown above, when the lot ID for chip-marking is represented as a 3-character sequence in the 62 decimal numeration system, 23,828 lot IDs for chip-marking can be generated. Conventional lot IDs of the semiconductor devices manufactured for at least several years do not approach this amount, so they can be marked using the above described approach, even if outputs of the semiconductor devices significantly increase.

In step S14, a wafer identifier for chip-marking can be generated by coding the conventional number of the wafer on which the chip is formed into 1-character, e.g., using up to about 25 identification symbols in this embodiment. For example, the wafer identifier for chip-marking can be represented using 25 alphabetical letters. That is, when the chip is formed on a first wafer, the wafer identifier for chip-marking can be represented as "A, " and when the chip is formed on a $25^{th}$ wafer, the wafer identifier for chip-marking can be represented as "Y."

In step S16, the chip coordinate for chip-marking can be generated by coding the conventional coordinates of each chip in the wafer on which the chip is formed into either a 1- or a 2-character sequence using the decimal numeration system or the 62 decimal numeration system. In an example embodiment, the chip coordinate for chip-marking is represented not as a type of x-coordinate and y-coordinate, i.e., a coordinate of each chip in the wafer, but as a character sequence corresponding to the order in which each chip is probed for the test in the EDS process. The chip coordinate for chip-marking preferably has a value that corresponds to a number that is the same as that of a net die of the wafer, so as to uniquely indicate each of the chips on the wafer, a total number of which is preferably the same as the number of the net die.

In an example embodiment, the chip coordinate for chip-marking is a 2-character sequence, which includes a numeral, an alphabetical small letter and an alphabetical capital letter, using the 62 decimal numeration system. The chip coordinate for chip-marking can be generated for each chip on a wafer having less than or equal to 3,844 net dies.

Table 2 shows an example in which conventional chip coordinates used in the EDS process are coded into the chip coordinates for chip-marking, each having 2 characters in the 62 decimal numeration system.

TABLE 2

| Probing Order | X-Coordinate | Y-Coordinate | Chip Coordinate for Chip-Marking |
|---|---|---|---|
| 1 | 100 | 100 | 01 |
| 2 | 101 | 100 | 02 |
| 3 | 102 | 100 | 03 |
| 4 | 103 | 100 | 04 |
| 5 | 104 | 100 | 05 |
| . | . | . | . |
| . | . | . | . |
| . | . | . | . |
| 629 | 85 | 105 | A9 |
| . | . | . | . |
| . | . | . | . |
| . | . | . | . |
| 3792 | 145 | 110 | Za |
| 3793 | 146 | 110 | Zb |

The lot ID, wafer identifier, and chip coordinate for chip marking are written in the order named on a rear face of the chip in the wafer in step S18.

FIG. 2 shows an embodiment of a system 200 that can be used to implement the method of FIG. 1 for generating a chip information character set. For example, the system 200 can be a known computer platform (e.g., a personal computer, personal digital assistant, or the like), including at least one processor and storage device or media, and configured with functionality that generates the chip character information set from a conventional chip character information set. The functionality, e.g., the method of FIG. 1, can be implemented in any combination of hardware, software and/or firmware. In the preferred form, the functionality of the chip information character set is implemented in a computer program code that is executable by a processor within the system 200. Conventional chip information character sets can be read in by, e.g., a bar code reader 210 from a bar coded label 215, or entered via other devices, e.g., a keyboard 220. Regardless of the manner of input, the system 200 generates a corresponding chip information character set.

For example, as shown in FIG. 2, the conventional chip information character set can be represented as K3256703123100, which can be represented in the bar code information of label 215. The conventional lot ID is "K32567" in the fabrication line for the semiconductor device, the wafer is the third wafer in the lot (i.e., "WF NO=3"), and the chip has x and y coordinates of 123, 100 in the wafer.

The conventional lot ID used in the fabrication line for the semiconductor device can be inputted into a computer system by reading a bar code. From the conventional character set K3256703123100, a character set "001C03" (225 in FIG. 2) can be generated, as discussed above and in accordance with the present disclosure. That is, the lot ID can be represented as "001," the wafer number can be represented as "C," and the chip coordinates can be represented as "03" in the 62 decimal numeration system. And the chip information character set can be stored in a database within or linked to the computer system 200. The chip information character set including the lot ID, the wafer identifier, and the chip coordinate for chip-marking can be written on the wafer by a laser marking process, for example. For instance, when the wafer needs polishing in the rear face, a marking process can be performed, after polishing, to write the chip character set.

The marking process for writing a conventional character set on each chip takes a relatively long time, as the conventional chip information character set has a relatively large number of characters. In contrast, writing a chip information character set in accordance with the present disclosure takes significantly less time, since each of the lot ID, the wafer identifier, and the chip coordinate for chip-marking included in the chip information character set has a smaller number of characters than that of the conventional lot ID, the conventional wafer number, and the conventional coordinates of the chip, respectively. As a result, manufacturing the semiconductor device takes less time, and productivity of the semiconductor device can be increased using the chip information character set.

In the preferred form, the chip information character set is marked only on chips that have been sorted into superior goods in the EDS process. That is, when the marking process has been performed, the chip information character sets can be written on rear faces of the superior goods, whereas the chip information character sets are not written on rear faces of inferior goods, thereby distinguishing the superior goods from the inferior goods.

According to aspects of the present invention, a chip information character set including a lot ID, a wafer identifier, and chip coordinate for chip-marking can have a smaller number of characters than that of a conventional chip information character set, which includes a longer conventional lot ID, conventional wafer number, and conventional chip coordinates used in a fabrication line for a semiconductor device. Thus, using systems and methods in accordance with the present disclosure, marking the chip information character set on the chip takes less time and a productivity of the semiconductor device can be increased.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A chip information character set generation system comprising:
   a processor coupled to at least one storage device, the storage device configured to store the chip information character set;
   a computer program code loaded on the at least one storage device and executable by the processor to perform a method of generating the chip information character set for chip marking from a first chip information character set, the generated chip information character set having fewer characters than the first chip information character set, the method comprising:
   generating a lot ID from a first lot ID used in a fabrication line for a semiconductor device, by coding the first lot ID using at least one of a decimal numeration system or a 62 decimal numeration system, wherein the generated lot ID has fewer characters than the first lot ID;

generating a 1-character wafer identifier from a first wafer number by coding the first wafer number as a symbol from a set of identification symbols; and generating a 1- or a 2-character chip coordinate from first chip coordinates of the chip in the wafer by coding the first chip coordinates using at least one of the decimal numeration system or the 62 decimal numeration system, wherein the generated chip coordinate has fewer characters than the first chip coordinates.

2. The system of claim 1, wherein the generated lot ID includes a numeral, an alphabetical small letter and an alphabetical capital letter in the 62 numeration system.

3. The system of claim 2, wherein the generated lot ID is a 3-character sequence.

4. The system of claim 1, wherein the generated chip coordinate includes a numeral, an alphabetical small letter, and an alphabetical capital letter in the 62 numeration system.

5. The system of claim 4, wherein the generated chip coordinate is a 2-character sequence.

6. The system of claim 1, wherein the generated chip coordinate indicates an order in which the chip is to be probed for a test in an electric die sorting (EDS) process.

7. The system of claim 1, wherein the generated wafer identifier includes an alphabetical letter.

8. The system of claim 1, wherein the set of identification symbols is not more than 25 predefined identification symbols.

9. A method of marking a chip with a chip information character set, the chip information character set having fewer characters than a first chip information character set, the method comprising:

acquiring the first chip information character set including a first lot ID, a first number of a wafer, and a first coordinate of a chip in the wafer used in a fabrication line for a semiconductor device;

generating a lot ID for chip-marking by coding the first lot ID using a decimal numeration system or a 62 decimal numeration system, wherein the lot ID for chip-marking has a smaller number of characters than the first lot ID;

generating a wafer identifier for chip-marking by coding the first number of the wafer including the chip into a 1-character identifier from up to 25 identification symbols;

generating a chip coordinate for chip-marking by coding the first coordinates of the chip in the wafer into either 1-character or 2-characters using the decimal numeration system or the 62 decimal numeration system; and writing the generated lot ID, the generated wafer identifier, and the generated chip coordinate for chip-marking on a rear face of the chip.

10. The method of claim 9, wherein the generated lot ID includes a numeral, an alphabetical small letter and an alphabetical capital letter in the 62 numeration system.

11. The method of claim 10, wherein the generated lot ID is a 3-character sequence.

12. The method of claim 9, wherein the generated chip coordinate includes a numeral, an alphabetical small letter and an alphabetical capital letter in the 62 numeration system.

13. The method of claim 12, wherein the generated chip coordinate is a 2-character sequence.

14. The method of claim 9, wherein the generated chip coordinate indicates an order in which the chip is to be probed for a test in an electric die sorting (EDS) process.

15. The method of claim 9, wherein the generated wafer identifier includes an alphabetical letter.

16. The method of claim 9, wherein the generated lot ID, the generated wafer identifier, and the generated chip coordinate are written only on chips which are determined as superior goods in an EDS process.

17. The method of claim 9, further comprising:

laser marking the generated lot ID, the generated wafer identifier, and the generated chip coordinate on the rear face of the chip.

18. A method of generating a chip information character set for chip marking from a first chip information character set, the generated chip information character set having fewer characters than the first chip information character set, the method comprising:

generating a lot ID from a first lot ID used in a fabrication line for a semiconductor device, by coding the first lot ID using at least one of a decimal numeration system or a 62 decimal numeration system, wherein the generated lot ID has fewer characters than the first lot ID;

generating a 1-character wafer identifier from a first wafer number by coding the first wafer number as a symbol from a set of identification symbols; and generating a 1- or a 2-character chip coordinate from first chip coordinates of the chip in the wafer by coding the first chip coordinates using at least one of the decimal numeration system or the 62 decimal numeration system, wherein the generated chip coordinate has fewer characters than the first coordinates.

19. The method of claim 18, wherein the set of identification symbols is not more than 25 predefined identification symbols.

20. The method of claim 19, wherein the generated lot ID includes a numeral, an alphabetical small letter and an alphabetical capital letter in the 62 numeration system.

21. The method of claim 19, wherein the generated chip coordinate includes a numeral, an alphabetical small letter and an alphabetical capital letter in the 62 numeration system.

22. The method of claim 19, wherein the generated chip coordinate indicates an order in which the chip is to be probed for a test in an electric die sorting (EDS) process.

* * * * *